Figure 1:
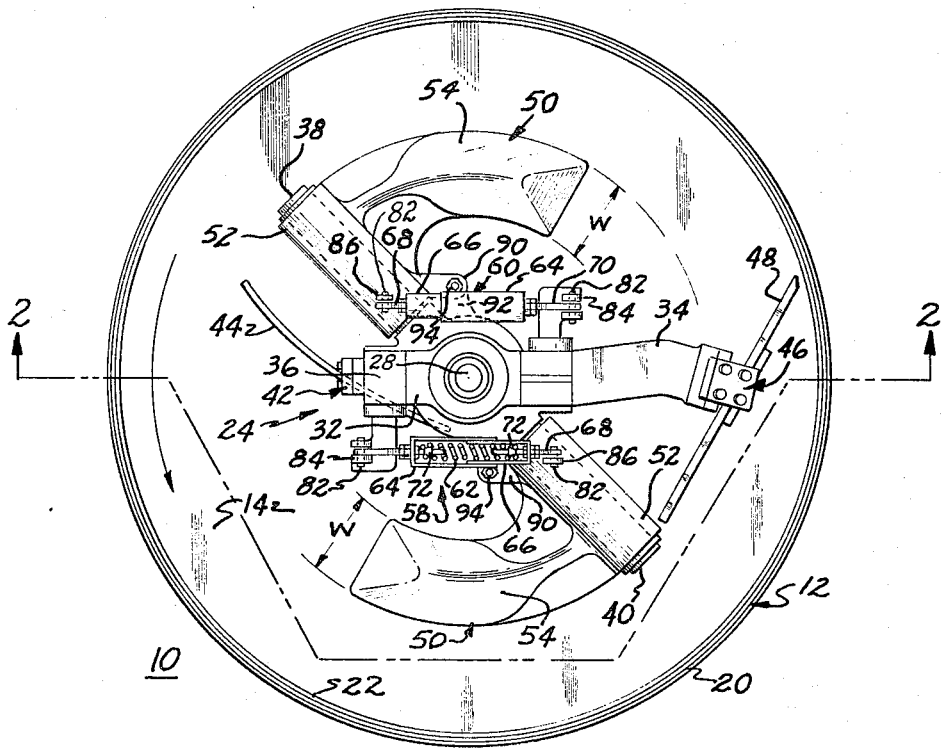

Nov. 8, 1966          E. C. TROY          3,284,059
MULLING SHOE MIXER
Filed March 18, 1965

INVENTOR.
ELBERT C. TROY

BY Mason, Kolehmainen,
Rathburn & Wyss.

ATTORNEYS

# United States Patent Office 3,284,059
Patented Nov. 8, 1966

3,284,059
MULLING SHOE MIXER
Elbert C. Troy, Highland Park, Ill., assignor, by mesne assignments, to National Engineering Company, Chicago, Ill., a corporation of Delaware
Filed Mar. 18, 1965, Ser. No. 440,901
10 Claims. (Cl. 259—107)

The present invention relates to a new and improved apparatus for conditioning material and, more specifically, pertains to a new and improved mixing apparatus for use in pulverizing, kneading, and mixing granular material and the like, such as foundry sand, in preparation for use in molding operations. It is to be understood that the apparatus of the present invention is useful for conditioning a wide variety of different materials wherein intensive pulverization, smearing action, and intimate mixing of the material are required.

Mixing and mulling machines in common use in foundries usually includes a mixing head assembly mounted for rotation in a mixing chamber or crib. The mixing head assemblies of these machines are generally provided with one or more large, heavy mulling wheels which are mounted for free rotation on horizontal axles extending outwardly from the central axis of the head assembly. The mulling wheels generally have a conical or cylindrical outer peripheral mulling surface which engages the material in the crib and forces it against the bottom of the mixer to break up lumps and pulverize the material into smaller particles or granules.

Because the mulling wheels of these machines are circular, the mulling surface thereof, in engagement with the material at a given instant, is somewhat limited in area because the surface must necessarily comprise only a small portion of the total perimeter of the wheel. Accordingly, the amount of material compressed between the mulling surface of the wheel and the bottom of the mixer crib at a given instant is relatively small because it is dependent to large extent on the diameter of the wheel. Moreover, because the wheels are circular, the mulling surface thereof, encountering the material as the head assembly rotates, slopes upwardly at a relatively large angle of attack with respect to the surface level of the material and, accordingly, a considerable amount of the material may be moved to one side or the other of the wheel rather than remaining under the path of the wheel wherein effective pulverization is accomplished. This phenomenon is especially noticeable with relatively light materials and/or small diameter mulling wheels wherein it is difficult to make the mulling wheels climb up and ride on top of the material to provide the most effective mulling action.

Accordingly, it is an object of the present invention to provide a new and improved apparatus for mixing, pulverizing, and kneading bulk materials.

More specifically, it is an object of the present invention to provide a new and improved apparatus of the type described which does not require the use of large diameter, heavy, circular mulling wheels for obtaining the desired pulverizing and mulling action on the material and, consequently, the overall size of the apparatus of the present invention can be reduced without sacrificing mulling action.

Another object of the present invention is the provision of a new and improved mixing apparatus of the type described which provides an intense kneading or smearing of the material.

Yet another object of the present invention is the provision of a new and improved mixing apparatus of the type described wherein the material is subjected to an intense smearing and shearing action between two relatively moving surfaces.

Another object of the present invention is the provision of a new and improved mixer of the type described, including movable mulling means having an enlarged mulling surface which is in continuous mulling engagement with a larger surface area of the material than that possible with a mixer of the same size employing circular mulling wheels.

Yet another object of the present invention is the provision of a new and improved mixer of the type described including movable mulling means having an enlarged mulling surface shaped to engage the surface of the material at a much lower angle of attack than that possible with a mixer of the same size employing circular mulling wheels.

Still another object of the present invention is the provision of a new and improved mixer of the type described including a rotary head assembly with mulling shoes pivotally mounted thereon having enlarged mulling surfaces trailing behind the pivot axes of the shoes in a direction opposite that of the head rotation for engaging the material with a kneading and pulverizing action.

Another object of the present invention is the provision of a new and improved mixer of the type described wherein the mulling surfaces of the shoes are resiliently biased downwardly against the material to provide adjustable mulling pressures.

Figure 2:
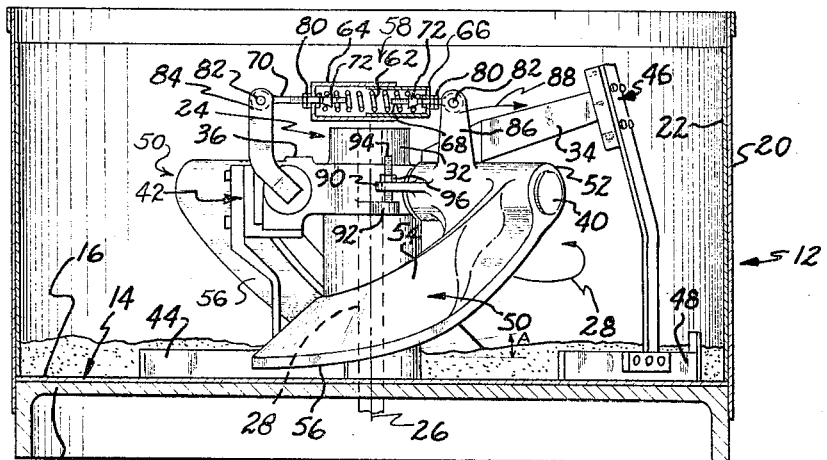

For a better understanding of the present invention reference is made to the following detailed description taken in conjunction with the drawings, in which:

FIG. 1 is a top plan view of a new and improved apparatus for mixing and pulverizing material constructed in accordance with the features of the present invention; and FIG. 2 is a transverse sectional view taken substantially along line 2—2 of FIG. 1.

Briefly, the present invention comprises a new and improved apparatus for conditioning material including a mixing chamber having a bottom wall for supporting a mass of said material to be conditioned. A mixing head assembly is mounted in said chamber for rotation in one direction about a central axis. The head assembly includes a pressure shoe for forcing the material against the bottom wall of the chamber as the head assembly rotates to mull and pulverize the material between the shoe and bottom wall of the mixing chamber. The shoe is mounted for pivotal movement about an axis extending outwardly from the head assembly and includes a body portion trailing the pivot axis in a direction opposite the direction of rotation of the head assembly. The body portion of the shoe includes an enlarged pressure surface facing the bottom wall of the chamber, and the surface is contoured to slope gradually upward away from the bottom wall towards the pivot axis of the shoe. The material is pressed between the moving pressure surface of the shoe and the bottom of the mixing chamber and is subjected to an intense smearing or kneading action. Preferably, the shoe is curved relative to the central axis of the head assembly forming a concentric, arcuate portion to provide a concentric, circular travel path of the pressure surface about the mixing chamber as the head assembly is rotated. Adjustable means are provided for resiliently biasing the pressure surface of the shoe toward the bottom wall of the mixer in order to increase the mulling pressure on the material as desired.

Referring now more particularly to the drawings, therein is illustrated a mixer 10 for conditioning material constructed in accordance with the features of the present invention. The mixer 10 includes a mixing chamber or crib 12 having a circular bottom wall structure 14 constructed with a removable upper wear plate 16 which is mounted on a lower supporting bed structure 18. The mixing chamber includes a cylindrical outer sidewall 20 which is provided with a replaceable inner wall liner 22, and the chamber is adapted to contain and hold a batch or quantity of sand or other material which is to be conditioned.

A mixing head assembly 24 is mounted in the mixing chamber 12 for rotation about the central axis 26 thereof, and the assembly is supported on and rotated by a central drive shaft 28 which extends downwardly through the bottom of the chamber and is drivingly connected to a drive unit (not shown) positioned below the mixing chamber. The head assembly 24 comprises a cast turret-head 32 having a pair of integrally formed, diametrically opposed, radially outwardly extending plow support arms 34 and 36; and a pair of diametrically opposed, radially outwardly extending shoe supporting axles 38 and 40 are spaced intermediate the plow support arms.

The plow support arm 36 is shorter than the arm 34 and carries an inner plow assembly 42 which includes an inner plow or scraper blade 44 having a lower edge disposed to move in contact with, or close proximity to, the upper surface of the wear plate 16. As can be seen from FIG. 1, the inner plow blade 44 is positioned to extend outwardly from the central portion of the mixing chamber and is arranged with respect to the direction of rotation of the head assembly, as shown in FIG. 1, in order to move material in the central portion of the chamber outwardly toward the wall liner 22 as the head assembly rotates. An outer plow assembly 46 is carried by the support arm 34 and includes an outer plow or scraper blade 48 having a lower edge disposed to move in contact with or close proximity to the upper surface of the wear plate 16. The outer plow blade 48 is positioned to extend inwardly from the outer peripheral portion of the mixing chamber and is arranged with respect to the direction of rotation of the head assembly, as shown in FIG. 1, in order to move material adjacent the outer perihpery inwardly toward the center of the chamber as the head assembly rotates.

In accordance with the present invention, a mulling shoe 50 is carried by each of the radially extending axles 38 and 40 (FIG. 2) and, because both of the mulling shoes 50 are identical, only one of the shoes will be described in detail herein. The shoes 50 each include a cylindrical forward end portion 52 journaled on one of the respective axles 38 and 40 for free rotation about the radially extending axes thereof and an integrally formed, rearwardly extending or trailing portion 54 disposed to extend from the portion 52 in a direction generally opposite the direction of rotation or movement of the shoes around the mixing chamber. Preferably, the shoes are constructed of heavy material, such as cast steel or the like, and the trailing portions 54 have substantial weight in order to provide the required mulling pressure.

The shoes 50 may also be formed of ceramic material hardened to resist abrasive wear, and shoes of this type would provide the advantages of reducing metal contamination of the material and preventing sparks or electrical discharges from occuring because of movement of the shoes around the mixing chamber.

The trailing portion 54 of each shoe is formed with an enlarged lower surface 56 disposed to face the bottom wall of the mixing chamber, and the surface 56 forms a pressure or mulling surface for engagement with the material in the crib to force it against the bottom wall of the mixing chamber, thereby providing a smearing and kneading action which breaks up lumps and pulverizes the material. In fact, the material is squeezed between the moving pressure surfaces 56 and the wear plate 16 and is subjected to a continual shearing action caused by the smearing of the material against the wear plate. Referring to FIG. 2, it can be seen that the rearmost portion of the mulling surface 56 is substantially flat and that the surface forward of the flat portion slopes gradually upwardly away from the bottom wall of the mixing chamber at a gradually increasing rate, toward the cylindrical portion 52 of the shoe. The angle A of FIG. 2 represents the angle of attack of the approaching mulling surfaces 56 with respect to the upper surface of the material in the chamber, and it should be noted that this angle can be selected as desired by the proper shaping or contouring of the mulling shoe. The angle of attack, A, is considerably less than angles of attack attainable with conventional circular mulling wheels because the latter angles are fixed by the diameter of the wheels and the height of the upper level of the material in the mixer. Because the diameter of the circular mulling wheels is always limited to a great extent by the diameter of the mixing chamber and by strength and weight considerations in the construction of the mixer, it is only possible to provide the low angles of attack obtainable with the mulling shoes of the present invention by increasing the diameter of the wheels and the size of the mixer. In addition, because the curve or upward slope of the mulling surfaces 56 is relatively gradual, the mulling shoes 50 can be relatively small in size and still provide an enlarged mulling surface which is in continuous mulling contact with the material over a much greater area than that possible with a comparable size machine having circular mulling wheels. Accordingly, a relatively small size mixer constructed in accordance with the present invention, provides an area of mulling contact with the material which is much greater than that obtainable in larger mixers using circular mulling wheels.

Because of the foregoing advantages, mixers constructed in accordance with the present invention can operate at lower costs and reduced power requirements. It should be noted from FIG. 1 that the trailing portions 54 of the shoes are curved relative to the central axis of the head assembly, each including a concentric arcuate portion to provide for a concentric circular travel path of the mulling surfaces around the mixing chamber.

It should also be noted that the width W of the trailing portions 54 of the shoes can be further increased, if desired, to provide for additional area of smearing contact with the material. Any increase in the width or thickness of circular mulling wheels in a conventional mixer is necessarily limited because of clearance requirements between the wheels and the mixing chamber sidewalls, but this limiting factor is not encountered with the mulling shoes of the present invention, and the width of the shoes can be increased to the extent that the path traversed by the shoes covers substantially all of the area of the wear plate if desired.

Another advantage of the present invention over previous mixers employing circular mulling wheels is that, when the pressure of mulling surfaces 56 on the mulling shoes wear down, they can be resurfaced by the use of "Stellite" material or other hard material applied in an arc-welding process. Conventional circular mulling wheels cannot be resurfaced in this manner unless the wheels are then trued up on a lathe after application of the resurfacing material. With large mulling wheels, the latter process is expensive and cumbersome and requires large and costly equipment. Moreover, if circular mulling wheels wear unevenly around the peripheral surface thereof, the wheels must be removed for truing on a lathe because unbalanced wheels cause excessive wear on the bearings and other mechanisms of the head assembly. The mulling shoe arrangement of the present invention eliminates many of these problems and provides the advantage of having a large mulling surface which is in continuous contact with the material, whereas a circular muller has only a small fraction of its peripheral mulling surface in contact with the material at any one instant. Because only a small portion of the mulling surface is in contact with the material at any one instant, uneven wear oftentimes occurs around the surface of the wheel because of the difficulty in obtaining uniform hardness of the material throughout the entire mulling surface of the wheel.

As the mulling shoes 50 move around the mixing chamber 12 with the rotating head assembly 24, the pressure surfaces 56 thereof encounter the material in the crib and tend to ride upwardly over the material in a sort of floating action which crushes and pulverizes any lumps or agglomerates in the material. Because of the relatively low angle of attack between the moving surfaces 56 and the upper level of the material, almost all of the material passes directly beneath the shoes and there is very little tendency for the material to be moved to one side or the other out of the path of the shoes. When circular mulling wheels having relatively high angles of attack are utilized, a large portion of the material sometimes moves to the sides of the wheel and does not pass thereunder for pulverization. This is especially true when the material being prepared is relatively light in density and highly flowable, and it has been found that these types of materials can be conditioned in a much shorter time with the mixer of the present invention than with mixers employing circular mulling wheels. The lower angle of attack of the mulling shoes also provides for a much more intense kneading or smearing action on these light and flowable materials than is possible with circular mulling wheels having a relatively high angle of attack and a small area of contact with the material.

As can be seen from the drawings, the shoes 50 are of heavy construction and are formed with a triangular-shaped cross section. In applications where heavier mulling pressures are needed, the shoes can be made of heavier construction and the cross section thereof can be selected to provide additional weight. In order to further increase the mulling pressures of the shoes, especially when large lumps of material are encountered tending to cause the trailing portions 54 of the shoes to ride upwardly a considerable distance, a pair of spring assemblies 58 and 60 is carried by the head assembly and each of these assemblies is connected to one of the shoes for resiliently biasing one of the shoes in a direction to force the mulling surface 56 thereof downwardly toward the bottom wall of the mixing chamber. The spring assemblies 58 and 60 are identical and each includes a longitudinally extending tension spring 62 having opposed end coils of reduced diameter and enclosed by a pair of telescoping cover members 64 and 66.

Each spring assembly includes a pair of pull rods 68 and 70 axially aligned with the spring 62 and extending outwardly from the opposite ends thereof. A stop nut 72 of conical shape is threaded onto the inner end of each pull rod for engagement with the reduced diameter end coils of the spring in order that that spring will be put under tension when the rods are pulled in opposite directions and the position of the stop nuts on the rods may be adjusted in order that the spring 62 will not be subject to tension until the rods are pulled apart a selected distance. The telescoping cover members 64 and 66 are secured to the respective pull rods passing therethrough by means of nuts 80 and move therewith, indicating the amount of elongation of the spring inside.

The outer ends of the pull rods 68 and 70 are formed with eyelets to receive transverse connecting pins 82 for connecting the rods to respective members of the head assembly and the mulling shoes. The eyelet ends of the rods 70 are connected with the upper ends of fixed, upstanding arms or brackets 84 which are secured to the turret casting 32 of the head assembly 24. The eyelet ends of the rods 68 are connected with the upper ends of movable arms 86 which extend upwardly and are integrally formed with the cylindrical portions 52 of each of the respective shoes 50.

During rotation of the head assembly around the mixing chamber, the trailing portions 54 of the shoes tend to float or ride upwardly on the material in the crib passing underneath and, accordingly, the shoes pivot about the axles 38 and 40 on which they are mounted. As this occurs, the arms 86 tend to move in the direction of the arrow 88 (FIG. 2). When the arms 86 move away from the fixed brackets 84 a predetermined selected distance, the springs 62 are brought under tension and the pressure surfaces 56 of the shoes are then biased resiliently downwardly to provide increased mulling pressure. Large lumps of material encountered by the shoes tend to increase the upward movement of the trailing portions 54 and, consequently, the tension springs 62 exert an increasing bias on the shoes to break up the lumps. In cases where the material being pulverized is light and the lumps therein are easily broken up, the weight of the shoes alone may provide sufficient mulling pressures and the conical nuts 72 may be adjusted so that the springs 62 will not exert a biasing force on the shoes until the arms 86 have moved a considerable distance from the fixed brackets 84. The nuts 72 may also be adjusted so that only a short amount of movement of the arms 86 is needed to put the springs in tension, thereby providing a continuous resilient biasing force on the shoes.

In order to limit the downward movement of the trailing portions 54 of the shoes toward the bottom wall of the mixing chamber, each shoe 50 is provided with an integrally formed stop arm 90 adapted to overlie a fixed abutment 92 formed on the turrethead 32. A stop pin 94 is mounted to extend downwardly through each stop arm 90 in adjustable, threaded engagement therewith so that the lower end of the pin will engage the upper surface of an abutment 92 to limit the downward travel of the shoe. A locknut 96 is provided on each pin 94 to hold the pin in a selected position relative to the stop arm 90 and, by threadably adjusting the pins 94, the downward movement of the trailing portions of the shoes can be limited to a selected level as desired, and contact between the mulling surfaces 56 of the shoes and the upper surface of the wear plate 16 can be prevented if desired.

As can be seen from FIG. 1, the shoes 50 traverse a circular path around the mixing chamber which is concentric with the central axis 26 thereof. The plow blades 44 and 48 are positioned diametrically opposite one another between the mulling shoes and move the material outwardly and inwardly, respectively, into the travel path of the shoes where the intense kneading or smearing action takes place. The present invention provides many important advantages over prior machines, as discussed herein, and provides a new and unique mixer which can effectively condition a wide variety of materials including those having relatively low densities and high flowability characteristics.

While there have been illustrated and described several embodiments of the present invention, it will be appreciated that numerous changes and modifications will occur to those skilled in the art, and it is intended in the appended claims to cover all those changes and modifications which fall within the true spirit and scope of the present invention.

What is claimed as new and desired to be secured by Letters Patent of the United States is:

1. Apparatus for conditioning material comprising a mixing chamber having a bottom wall for supporting a mass of said material, a mixing head assembly mounted in said chamber for rotation in one direction about a central axis, said head assembly including a pressure shoe for forcing said material against said bottom wall, means mounting said shoe for pivotal movement about a pivot axis extending outwardly of said central axis, said shoe including a body portion extending to trail said pivot axis in a direction opposite said direction of rotation, said body portion including an enlarged pressure surface facing said bottom wall and sloping upwardly toward said pivot axis.

2. Apparatus as defined in claim 1 wherein said shoe is curved relative to the central axis forming a concentric arcuate portion to provide a concentric circular travel path of said pressure surface about said central axis.

3. Apparatus for conditioning material comprising a mixing chamber having a bottom wall for supporting a mass of said material, a mixing head assembly mounted in said chamber for rotation in one direction about a central axis, said head assembly including a pressure shoe for forcing said material against said bottom wall, means mounting said shoe for pivotal movement about a pivot axis extending outwardly of said central axis, said shoe including a body portion trailing said pivot axis in a direction opposite the direction of rotation of said head assembly, said body portion including an enlarged pressure surface facing said bottom wall and sloping upwardly toward said pivot axis, and means on said head assembly connected to said shoe for urging said shoe and its pressure surface toward said bottom wall.

4. Apparatus as defined in claim 3 including adjustable stop means for limiting the movement of said shoe and its pressure surface toward said bottom wall.

5. Apparatus as defined in claim 3 wherein said urging means includes an actuating arm on said shoe extending upwardly from said pivot axis and an adjustable tension spring assembly connected to said arm urging said shoe and its pressure surface toward said bottom wall.

6. Apparatus as defined in claim 5 wherein said head assembly includes a fixed upstanding arm spaced from said pivot axis and connected to one end of said tension spring assembly.

7. Apparatus as defined in claim 6 wherein said shoe is circularly curved to provide a concentric circular travel path of said pressure surface about said central axis.

8. Apparatus for conditioning material comprising a mixing chamber having a bottom wall for supporting a mass of said material, a mixing head assembly mounted in said chamber for rotation in one direction about a central axis, said head assembly including a pressure shoe for forcing said material against said bottom wall, means mounting said shoe for pivotal movement about a pivot axis extending outwardly of said central axis, said shoe including a body portion trailing behind said pivot axis in a direction opposite said one direction, said body portion including an enlarged pressure surface facing said bottom wall and curving upwardly toward said pivot axis, said surface having a trailing end portion remote from said pivot axis lying substantially parallel to said bottom and sloping gradually upward at an increasing rate toward said pivot axis.

9. Apparatus for conditioning material comprising a mixing chamber having a bottom wall for supporting a mass of said material and an upstanding cylindrical sidewall for laterally containing said mass, a mixing head assembly mounted in said chamber for rotation in one direction about a central axis, said head assembly including a pair of pressure shoes diametrically positioned on opposite sides of said central axis for forcing said material against said bottom wall, means for mounting each of said shoes for pivotal movement about respective pivot axes extending outwardly of said central axis, each of said shoes including a body portion extending to trail its respective pivot axis in a direction opposite said one direction, said body portion of each shoe including an enlarged pressure surface facing said bottom wall and sloping upwardly toward its respective pivot axis, said shoes being circularly curved about said central axis providing a concentric circular travel path of said pressure surfaces intermediate said central axis and said cylindrical sidewall, said head assembly including a pair of plows diametrically positioned on opposite sides of said central axis between said shoes for moving material into the path traversed by said shoes.

10. Apparatus as defined in claim 9 wherein one of said plows includes a portion positioned inwardly of said travel path and is angularly disposed relative to said path to direct material outwardly into said path as said head rotates, the other of said plows including a portion positioned outwardly of said travel path adjacent said sidewall and angularly disposed relative to said travel path to direct material inwardly into said path as said head rotates.

References Cited by the Examiner
UNITED STATES PATENTS

| | | | |
|---|---|---|---|
| 2,117,977 | 5/1938 | Nicholls. | |
| 2,970,778 | 2/1961 | McIlvaine | 259—107 |
| 3,069,145 | 12/1962 | Fejmert | 259—178 |
| 3,160,399 | 12/1964 | Harrison | 259—102 |

WALTER A. SCHEEL, *Primary Examiner.*

R. W. JENKINS, *Assistant Examiner.*